United States Patent
Feng et al.

(10) Patent No.: US 9,631,036 B2
(45) Date of Patent: Apr. 25, 2017

(54) FLUOROELASTOMERS

(71) Applicant: Honeywell International Inc., Morristown, NJ (US)

(72) Inventors: Kobe Feng, Shanghai (CN); Andrew J. Poss, Kenmore, NY (US); Jun Liu, Shanghai (CN); Yun Lin, Shanghai (CN); Rajiv R. Singh, Getzville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 101 days.

(21) Appl. No.: 13/789,330

(22) Filed: Mar. 7, 2013

(65) Prior Publication Data

US 2014/0080987 A1    Mar. 20, 2014

Related U.S. Application Data

(60) Provisional application No. 61/702,621, filed on Sep. 18, 2012.

(51) Int. Cl.

| C08F 14/14 | (2006.01) |
|---|---|
| C08F 14/18 | (2006.01) |
| C08F 14/28 | (2006.01) |
| C08G 61/04 | (2006.01) |
| C08F 214/18 | (2006.01) |
| C09J 123/08 | (2006.01) |
| C08L 23/08 | (2006.01) |

(52) U.S. Cl.
CPC .......... *C08F 14/185* (2013.01); *C08F 14/14* (2013.01); *C08F 14/28* (2013.01); *C08F 214/186* (2013.01); *C08G 61/04* (2013.01); *C08L 23/0815* (2013.01); *C09J 123/0815* (2013.01); *C08G 2261/135* (2013.01); *C08G 2261/3326* (2013.01); *C08G 2261/592* (2013.01); *C08G 2261/598* (2013.01); *C08L 2314/06* (2013.01)

(58) Field of Classification Search
USPC ........................................ 526/249, 255, 254
See application file for complete search history.

(56) References Cited

U.S. PATENT DOCUMENTS

| 4,513,128 | A | 4/1985 | Uschold | |
|---|---|---|---|---|
| 4,565,614 | A | 1/1986 | Buding et al. | |
| 7,576,164 | B2 | 8/2009 | Bauerle et al. | |
| 7,803,890 | B2 * | 9/2010 | Samuels et al. | ............... 526/252 |
| 7,862,741 | B2 | 1/2011 | Minor et al. | |
| 8,008,244 | B2 * | 8/2011 | Knopeck et al. | ............. 510/408 |
| 8,063,149 | B2 | 11/2011 | Samuels et al. | |
| 8,592,538 | B2 * | 11/2013 | Thomas et al. | ................ 526/238 |
| 2004/0092670 | A1 | 5/2004 | Schmiegel et al. | |
| 2006/0135716 | A1 | 6/2006 | Hung et al. | |
| 2007/0037922 | A1 * | 2/2007 | Tanaka et al. | ................. 524/544 |
| 2007/0219332 | A1 * | 9/2007 | Washino et al. | ................ 526/247 |
| 2008/0171844 | A1 * | 7/2008 | Samuels et al. | ................ 526/255 |
| 2008/0207861 | A1 | 8/2008 | Bauerle et al. | |
| 2009/0186986 | A1 * | 7/2009 | Nomura et al. | ............ 525/326.3 |
| 2010/0123095 | A1 | 5/2010 | Minor et al. | |
| 2011/0097529 | A1 * | 4/2011 | Durali et al. | ................. 428/36.9 |
| 2011/0269911 | A1 | 11/2011 | Morita et al. | |
| 2012/0190798 | A1 * | 7/2012 | Lyons et al. | ................... 525/362 |
| 2012/0289641 | A1 * | 11/2012 | Hirano et al. | ................. 524/443 |

FOREIGN PATENT DOCUMENTS

WO    WO2011/125740    10/2011

OTHER PUBLICATIONS

PCT Search Report—PCT/US2013/058909—Oct. 25, 2013.

* cited by examiner

*Primary Examiner* — Mark Kaucher
*Assistant Examiner* — Henry Hu
(74) *Attorney, Agent, or Firm* — Bruce O. Bradford

(57) ABSTRACT

A fluoroelastomer comprising a copolymer of fluoroolefin monomers selected from one or more of the group consisting of 2,3,3,3-tetrafluoropropene, 1,3,3,3-tetrafluoropropene and 1-chloro-3,3,3-trifluoropropene, and ethylenically unsaturated co-monomers; wherein the fluoroelastomer has a glass transition temperature (Tg) of from about −60° C. to about 53° C. A process of making the fluoroelastomer.

15 Claims, No Drawings

FLUOROELASTOMERS

CROSS REFERENCE TO RELATED APPLICATION

The present application claims priority under 35 U.S.C. §119(e) to U.S. Provisional Patent Application No. 61/702,621, filed on Sep. 18, 2012, the disclosure of which is incorporated herein by reference in its entirety.

FIELD OF THE INVENTION

This invention relates to fluoroelastomers having a very low glass transition temperature (Tg), and processes of making the same.

BACKGROUND OF THE INVENTION

A fluoroelastomer is a fluorocarbon-based synthetic rubber. Fluoroelastomers exhibit excellent resistances to heat, oil, solvents and chemicals, especially when compared to non-fluorinated elastomers. Currently, the most widely used fluoroelastomers are copolymers of vinylidene fluoride (VDF) with at least one other fluorinated co-monomer such as tetrafluoroethylene (TFE) and hexafluoropropylene (HFP). Apart from these well-known fluoroelastomers, other fluoroelastomers were developed for particularly demanding applications. For example, fluoroelastomers based on copolymers of TFE and perfluoro(methyl vinyl ether) (PMVE) have been developed that are resistant to prolonged exposure to temperatures as high as 280° C. Another special purpose fluoroelastomer, based on copolymers of TFE and propylene, has high vapor resistance and excellent processability.

These fluoroelastomers have many desirable properties and are particularly useful for applications that demand resistance to very high temperatures. However, their usefulness at low temperatures is limited by their usually relatively high glass transition temperature (Tg). A high Tg is generally regarded as an indicator that a fluoroelastomer is inflexible at low temperatures. When the temperature drops below the Tg of a particular fluoroelastomer, the fluoroelastomer becomes stiff or brittle and non-elastomeric. Fluoroelastomers having low glass transition temperatures are able to maintain elastomeric properties at low temperatures.

U.S. Pat. No. 4,513,128 discloses a fluoroelastomer which comprises tetrafluoroethylene/perfluoro(methyl vinyl ether) copolymers. This fluoroelastomer has a low Tg in the range of −15° C. to −100° C. when it contains 3 to 50 mole percent of copolymerized perfluorovinylpolyether (PVPE) of the following formula: $CF_2=CFO[CF_2CF(CF_3)O]_nR_f^1$, wherein $R_f^1$ is a $C_{1-12}$ perfluoroalkyl group and n is an integer between 3 to 30. Tetrafluoroethylene tends to be unstable and to decompose to C and $CF_4$, and is prone to form explosive peroxides when in contact with air while, and perfluorovinylpolyether (PVPE) monomers are extremely costly.

Thus, there remains a need to develop novel fluoroelastomers that include relatively low cost and non-hazardous monomers, yet have a low glass transition temperature. The present invention addresses this need.

SUMMARY OF THE INVENTION

The present invention provides a fluoroelastomer comprising a copolymer comprising a) fluoroolefin monomers selected from one or more of the group consisting of 2,3,3,3-tetrafluoropropene, 1,3,3,3-tetrafluoropropene and 1-chloro-3,3,3-trifluoropropene, and b) ethylenically unsaturated co-monomers; wherein the fluoroelastomer has a glass transition temperature (Tg) of from about −60° C. to about 53° C.

The present invention also provides a fluoroelastomer consisting essentially of a copolymer comprising a) fluoroolefin monomers selected from one or more of the group consisting of 2,3,3,3-tetrafluoropropene, 1,3,3,3-tetrafluoropropene and 1-chloro-3,3,3-trifluoropropene, and b) ethylenically unsaturated co-monomers; wherein the fluoroelastomer has a glass transition temperature (Tg) of from about −60° C. to about 53° C.

In certain embodiments of the present invention, the ethylenically unsaturated co-monomers are selected from one or more of the group consisting of ethylene, propene, butylene, cyclopentene, cycloheptene, cyclooctene and hexafluoropropylene.

In other embodiments of the present invention, all the ethylenically unsaturated co-monomers together are present in an amount of from about 30 to about 95 mole percent of all the monomers of the copolymer.

In other embodiments of the present invention, the mole ratio of all the fluoroolefin monomers together to all the ethylenically unsaturated co-monomers together is from about 1:0.8 to about 1:4.3.

In other embodiments of the present invention, the copolymer comprises curing site monomers.

In other embodiments of the present invention, the curing site monomers are selected from one or more of the group consisting of iodo-containing compounds, bromo-containing compounds, and iodobromo-containing compounds.

In other embodiments of the present invention, all the curing site monomers together are present in an amount of from about 0.02 to about 2 mole percent of all the monomers of the copolymer.

In other embodiments of the present invention, the iodo-containing compounds are selected from one or more of the group consisting of octafluoro-1,4-diiodobutane, diiodomethane, 1,2-diiodoethane, 1,3-diiodo-n-propane, 1,3-diiodoperfluoropropane, 1,3-diiodo-2-chloroperfluoropane, 1,4-diiodoperfluobutane, 1,6-diiodoperfluorohexane, 1,8-diiodoperfluorooctane, 1,12-diiodoperfluorododecane, and 1,16-diioperfluorohexadecane.

In other embodiments of the present invention, the bromo-containing compounds are selected from one or more of the group consisting of $CF_2Br_2$, $BrCF_2CF_2Br$, $CF_3CFBrCF_2Br$, and $BrCF_2CF_2CF_2Br$.

In other embodiments of the present invention, the iodobromo-containing compounds are selected from one or more of the group consisting of 2-bromo-4-iodoperfluorobutene-1,3-bromo-4-iodoperfluorobutene-1,1-bromo-2-iodoperfluoroethane, 1-bromo-3-iodoperfluoropropane, 1-bromo-4-iodoperfluorobutane, 2-bromo-3-iodoperfluorobutane, 3,4-dibromo-1-iodo-1,1,2,2,4,4-hexafluorobutane, and 3-bromo-4-iodoperfluorobutene-1,2-bromo-4-iodoperfluorobutene-1.

The present invention also provides a process of making any of the fluoroelastomers described above comprising a step of polymerizing the fluoroolefin monomers with the ethylenically unsaturated co-monomers via an emulsion polymerization process.

DETAILED DESCRIPTION OF THE INVENTION

This invention relates to a novel fluoroelastomer and process of making the same. It has surprisingly been found that fluoroelastomers of copolymers comprising fluoroolefin monomers (such as, 2,3,3,3-tetrafluoropropene (1234yf)) and ethylenically unsaturated co-monomers at a mole ratio of from about 1:0.8 to about 1:4.3 exhibit a low glass transition temperature (Tg) of about −60° C. to about 53° C.

The invention provides a fluoroelastomer comprising a copolymer comprising a) fluoroolefin monomers selected from one or more of the group consisting of 2,3,3,3-tetrafluoropropene ($CF_3CF=CH_2$), 1,3,3,3-tetrafluoropropene ($CF_3CH=CHF$) and 1-chloro-3,3,3-trifluoropropene ($CF_3CH=CHCl$), and b) ethylenically unsaturated co-monomers; wherein the fluoroelastomer has a glass transition temperature (Tg) of from about −60° C. to about 53° C. In a preferred embodiment, the fluoroelastomer of the present invention consists essentially of a copolymer comprising a) fluoroolefin monomers selected from one or more of the group consisting of 2,3,3,3-tetrafluoropropene, 1,3,3,3-tetrafluoropropene and 1-chloro-3,3,3-trifluoropropene, and b) ethylenically unsaturated co-monomers; wherein the fluoroelastomer has a glass transition temperature (Tg) of from about −60° C. to about 53° C.

In certain embodiments of the present invention, the fluoroelastomer has a glass transition temperature (Tg) of from about −2.7° C. to about −33° C. (see Table 1 below).

In certain embodiments of the present invention, the ethylenically unsaturated co-monomers are selected from one or more of the group consisting of ethylene, propene, butylene, cyclopentene, cycloheptene, cyclooctene and hexafluoropropylene. In a preferred embodiment of the present invention, all of the ethylenically unsaturated co-monomers are ethylene, propene or butylene.

In certain embodiments of the present invention, the ethylenically unsaturated co-monomers together are present in an amount of from about 30 to about 95 mole percent of all the monomers of the copolymer. In other embodiments of the present invention, the ethylenically unsaturated co-monomers together are present in an amount of from about 30 to about 45 mole percent, from about 45 to about 60 mole percent, from about 60 to about 85 mole percent, and from about 85 to about 95 mole percent of the polymer. In a preferred embodiment of the present invention, the co-monomers are present in an amount of about 44 to about 82 mole percent of all the monomers of the copolymer.

In certain embodiments of the present invention, the mole ratio of all the fluoroolefin monomers together to all the ethylenically unsaturated co-monomers together is from about 1:0.8 to about 1:4.3. In other embodiments of the present invention, the mole ratio of all the fluoroolefin monomers together to all the ethylenically unsaturated co-monomers together is from about 1:0.8 to about 1:1.4, from about 1:1.4 to about 1:1.6, from about 1:1.6 to about 1:2.9, from about 1:2.9 to about 1:3.4, and from about 1:3.4 to about 1:4.3.

Curing site monomers can be used to faciliating crosslinking of polymers. For example, the copolymers in fluoroelastomers are usually crosslinked (cured), thereby forming a three-dimensional network. In certain embodiments of the present invention, the copolymer comprises curing site monomers. In other embodiments of the present invention, the curing site monomers are selected from one or more of the group consisting of iodo-containing compounds, bromo-containing compounds, and iodobromo-containing compounds.

In certain embodiments of the present invention, the curing site monomers together are present in an amount of from about 0.02 to 2 mole percent of all the monomers of the copolymer. In other embodiments of the present invention, the curing site monomers together are present in an amount of from about 0.02 to about 0.10 mole percent, from about 0.10 to about 0.50 mole percent, from about 0.50 to about 1 mole percent, from about 1 to about 1.2 mole percent, from about 1.2 to about 1.5 mole percent, and from about 1.5 to about 2 mole percent of all the monomers of the copolymer.

In certain embodiments of the present invention, the iodo-containing compounds are selected from one or more of the group consisting of octafluoro-1,4-diiodobutane, diiodomethane, 1,2-diiodoethane, 1,3-diiodo-n-propane, 1,3-diiodoperfluoropropane, 1,3-diiodo-2-chloroperfluopropane, 1,4-diiodoperfluobutane, 1,6-diiodoperfluorohexane, 1,8-diiodoperfluorooctane, 1,12-diiodoperfluorododecane, and 1,16-diioperfluorohexadecane.

In certain embodiments of the present invention, the bromo-containing compounds are selected from one or more of the group consisting of $CF_2Br_2$, $BrCF_2CF_2Br$, $CF_3CFBrCF_2Br$, and $BrCF_2CF_2CF_2Br$.

In certain embodiments of the present invention, the iodobromo-containing compounds are selected from one or more of the group consisting of 2-bromo-4-iodoperfluorobutene-1,3-bromo-4-iodoperfluorobutene-1,1-bromo-2-iodoperfluoroethane, 1-bromo-3-iodoperfluoropropane, 1-bromo-4-iodoperfluorobutane, 2-bromo-3-iodoperfluorobutane, 3,4-dibromo-1-iodo-1,1,2,2,4,4-hexafluorobutane, and 3-bromo-4-iodoperfluorobutene-1,2-bromo-4-iodoperfluorobutene-1.

Non-limiting examples of curing site monomers that can be used within the scope of the present invention also include 4-bromo-3,3,4,4-tetrafluorobutene, bromotrifluoroethylene, 1-bromo-2,2-difluorolethylene, vinyl bromide, perfluoroallyl bromide and 3,3-difluoroallyl bromide and 4-bromo-perfluorobutene.

Any of the many methods/systems generally known in the art can be used for the curing of the fluoroelastomers of the present invention. Non-limiting examples include organic peroxide curing systems or polyhydroxy curing systems (e.g., bisphenol AF).

The monomers disclosed herein, such as 2,3,3,3-tetrafluoropropene ($CF_3CF=CH_2$), 1,3,3,3-tetrafluoropropene ($CF_3CH=CHF$) and 1-chloro-3,3,3-trifluoropropene ($CF_3CH=CHCl$), and all other materials disclosed herein, are generally known in the art and widely commercially available. These monomers and other materials are therefore not further described herein in detail.

The fluoroolefin monomers and ethylenically unsaturated co-monomers disclosed herein can be readily polymerized to copolymers and terpolymers by any of the numerous polymerization methods commonly known and described in the art.

The preferred method, for example, of synthesizing a copolymer of 2,3,3,3-tetrafluoropropene and ethylene (1234yf-co-ethylene) of the present invention is emulsion polymerization. In this process, the polymerization system comprises primarily water, one or more emulsifiers (with surfactants), a buffer solution, one or more initiators, and co-monomers. The co-monomers can be either loaded at the beginning of the reactiona or loaded continuously with a high pressure pump during the reaction. After polymerization, the copolymer is precipitated by adding electrolyte into the polymerization system. Copolymer powder is obtained after washing and drying. This method is enviromentally friendly because no chlorofluorocarbons or common solvents are used. Other common alternative synthesis methods such as solution polymerization and bulk polymerization can also be used and are within the scope of this invention.

Non-limiting examples of surfactants suitable for the preparation of the 1234yf-co-ethylene polymers of the present invention include fluorosurfactants, hydrocarbon surfactants, such as sodium octyl sulfonate, sodium dodecylsulfonates, sodium decyl sulfate, sodium caprylate, sodium stearate, and nonylphenolpoly(ethylene oxide). In a preferred embodiment of the present invention, a fluorosurfactant or perfluorinated carboxylic acid is used, such as ammonium perfluorooctonoate.

Non-limiting examples of buffer solutions suitable for the preparation of 1234yf-co-ethylene polymers of the present invention include disodium hydrogen phosphate, trisodium phosphate, and ammonium carbonate.

Non-limiting examples of initiators suitable for the preparation of 1234yf-co-ethylene polymers of the present invention include ammonium persulfate. Non-limiting examples of initiators suitable for the preparation of 1234yf-co-ethylene polymers of the present invention also include $Na_2S_2O_8$, $K_2S_2O_8$, $(NH_4)_2S_2O_8$, $Fe_2(S_2O_8)_3$, $(NH_4)_2S_2O_8/Na_2S_2O_5$, $(NH_4)_2S_2O_8/FeSO_4$, $(NH_4)_2S_2O_8/Na_2S_2O_5/FeSO_4$, and the like, and combinations thereof.

The present invention also provides a process of making the fluoroelastomers of the present invention comprising a step of polymerizing the fluoroolefin monomers with the ethylenically unsaturated co-monomers via an emulsion polymerization process.

The copolymerization may be conducted in any of the aqueous emulsion solutions commonly used in the art. Such aqueous emulsion solutions may include, but are not limited to, degassed deionized water, buffer compounds (such as, but not limited to, $Na_2HPO_4/NaH_2PO_4$), and an emulsifier (such as, but not limited to, $C_7F_{15}CO_2NH_{45}$ $CH_3(CH_2)_{11}OSO_3Na$, $C_{12}H_{25}C_6H_4SO_3Na$, $C_9H_{19}C_6H_4O(C_2H_4O)_{10}H$, or the like).

The copolymerization is typically carried out at a temperature, pressure and length of time sufficient to produce the desired copolymers and may be performed in any reactor known for such purposes, such as, but not limited to, an autoclave reactor.

In a preferred embodiment of the present invention, the copolymerization is carried out at a temperature from about 10° C. to about 100° C. and at a pressure from about 50 psi to about 1,000 psi. The length of the copolymerization may be any length of time to achieve the desired level of copolymerization. In certain embodiments of the present invention, the length of the copolymerization may be between about 24 hours to about 200 hours. One of skill in the art will appreciate that such conditions may be modified or varied based upon the desired conversion rate and the molecular weight of the resulting copolymer.

The structure of the copolymers of the present invention can be identified and characterized by nuclear magnetic resnance (NMR), infrared spectroscopy (IR), and elemental analysis. The termal properties of the polymers can be determined by thermogravimetric analysis (TGA) and differential scanning calorimetry. The performance of fluoroelastomer is tested by Moony viscometer.

The fluoroelastomers of the present invention are useful in a variety of applications, e.g., in the production of gaskets, tubings, seals and other molded parts.

The fluoroelastomers of the present invention can be used in areas that are characterized by very low temperatures.

The following examples further illustrate the present invention, but should not be construed to limit the scope of the invention in any way.

EXAMPLES

Example 1

Synthesis of Fluoroelastomer

To a 300 mL high pressure reactor, 150 mL of deionized water, 2 g of ammonium perfluorooctonoate, 0.4 g of ammonium persulfate, 1.2 g of $Na_2HPO_4$ and 0.73 g of $NaH_2PO_4.2H_2O$ were added. After 3 cycles of deoxygenation with nitrogen, the mixture solution was cooled to 0° C., and 37 g of 2,3,3,3-tetrafluopropene monomer were added to the reactor. After the resulting mixture had been stirred at a speed of 200 rpm for 5 minutes, 20 g of ethylene monomer were injected into the reactor over a time of 10 minutes, by using an injection pump. The reactor temperature was then maintained at 65° C. and the reactor contents were stirred at 400 rpm. After 48 hours, the polymerization was stopped and excessive gas was released from the reactor. The polymerization latex was coagulated in 25% HCl and the polymerization product was washed with distilled water and dried at 50° C. overnight. Finally, 14 g of white elastomer were obtained with a product yield of 25%. The product, composed of 41.7 mole percent of 1234yf and 58.3 mole percent of ethylene, as determined by NMR, was an amorphous fluoroelastomer having a glass transition temperature of 0° C., as determined by differential scanning calorimetry. The fluorine content of the elastomer was 50%. The fluorine content of the elastomer was calculated based on the moles of each monomer present in the copolymer.

Example 2

Synthesis of Fluoroelastomer

To a 300 mL high pressure reactor, 150 mL of deionized water, 2 g of ammonium perfluorooctonoate, 0.4 g of ammonium persulfate, 1.2 g of $Na_2HPO_4$ and 0.73 g of $NaH_2PO_4.2H_2O$ were added. After 3 cycles of deoxygenation with nitrogen, the mixture solution was cooled to 0° C., and 114 g of 2,3,3,3-tetrafluopropene monomer were added to the reactor. After the resulting mixture had been stirred at a speed of 200 rpm for 5 minutes, 28 g of ethylene monomer were injected into the reactor over a time of 10 minutes, by using an injection pump. The reactor temperature was then maintained at 65° C. and the reactor contents were stirred at 400 rpm. After 48 hours, the polymerization was stopped and excessive gas was released from the reactor. The polymerization latex was coagulated in 25% HCl and the polymerization product was washed with distilled water and dried at 50° C. overnight. Finally, 47 g of white elastomer were obtained with a product yield of 33%. The product, composed of 54.5 mole percent of 1234yf and 45.5 mole percent of ethylene, was an amorphous fluoroelastomer having a glass transition temperature of −3° C., as determined by differential scanning calorimetry. The fluorine content of the elastomer was 55.6%.

Example 3

Synthesis of Fluoroelastomer

To a 300 mL high pressure reactor, 150 mL of deionized water, 2 g of ammonium perfluorooctonoate, 0.4 g of ammonium persulfate, 1.2 g of $Na_2HPO_4$ and 0.73 g of $NaH_2PO_4.2H_2O$ were added. After 3 cycles of deoxygenation with nitrogen, the mixture solution was cooled to 0° C., and 43.7 g of 2,3,3,3-tetrafluoropropene monomer were added to the reactor. After the resulting mixture had been stirred at a speed of 200 rpm for 5 minutes, 20 g of ethylene monomer were injected into the reactor over a time of 10 minutes, by using an injection pump. The reactor temperature was then maintained at 65° C. and the reactor contents were stirred at 400 rpm. After 48 hours, the polymerization was stopped and excessive gas was released from the reactor. The polymerization latex was coagulated in 25% HCl and the polymerization product was washed with distilled water and dried at 50° C. overnight. Finally, 19 g of white elastomer were obtained with a product yield of 30%. The product, composed of 38.5 mole percent of 1234yf and 61.5 mole percent of ethylene, was an amorphous fluoroelastomer having a glass transition temperature of −5° C., as determined by differential scanning calorimetry. The fluorine content of the elastomer was 48.22%.

Example 4

Synthesis of Fluoroelastomer

To a 300 mL high pressure reactor, 150 mL of deionized water, 2 g of ammonium perfluorooctonoate, 0.4 g of ammonium persulfate, 1.2 g of $Na_2HPO_4$ and 0.73 g of $NaH_2PO_4 \cdot 2H_2O$ were added. After 3 cycles of deoxygenation with nitrogen, the mixture solution was cooled to 0° C., and 27.7 g of 2,3,3,3-tetrafluoropropene monomer were added to the reactor. After the resulting mixture had been stirred at a speed of 200 rpm for 5 minutes, 20 g of ethylene monomer were injected into the reactor over a time of 10 minutes, by using an injection pump. The reactor temperature was then maintained at 65° C. and the reactor contents were stirred at 400 rpm. After 48 hours, the polymerization was stopped and excessive gas was released from the autoclave. The polymerization latex was coagulated in 25% HCl and the polymerization product was washed with distilled water and dried at 50° C. overnight. Finally, 14 g of white elastomer were obtained with a product yield of 30%. The product, composed of 31.3 mole percent of 1234yf and 68.7 mole percent of ethylene, was an amorphous fluoroelastomer having a glass transition temperature of −8° C., as determined by differential scanning calorimetry. The fluorine content of the elastomer was 43.13%.

Example 5

Synthesis of Fluoroelastomer

To a 1000 mL high pressure reactor, 300 mL of deionized water, 6 g of ammonium perfluorooctonoate, 0.82 g of ammonium persulfate, 2.4 g of $Na_2HPO_4$ and 1.46 g of $NaH_2PO_4 \cdot 2H_2O$ were added. After 3 cycles of deoxygenation with nitrogen, the mixture solution was cooled to 0° C., and 66 g of 2,3,3,3-tetrafluoropropene monomer were added to the reactor. After the resulting mixture had been stirred at 200 rpm for 5 minutes, 64 g of ethylene monomer were injected into the reactor over a time of 10 minutes, by using an injection pump. The reactor temperature was then maintained at 65° C. and the reactor contents were stirred at 400 rpm. After 48 hours, the polymerization was stopped and excessive gas was released from the autoclave. The polymerization latex was coagulated in 25% HCl and the polymerization product was washed with distilled water and dried at 50° C. overnight. Finally, 113 g of white elastomer were obtained with a product yield of 87%. The product, composed of 25.6 mole percent of 1234yf and 74.4 mole percent of ethylene, was an amorphous fluoroelastomer having a glass transition temperature of −15° C., as determined by differential scanning calorimetry. The fluorine content of the elastomer was 38.61%.

Example 6

Synthesis of Fluoroelastomer

To a 300 mL high pressure reactor, 150 mL of deionized water, 2 g of ammonium perfluorooctonoate, 0.4 g of ammonium persulfate, 1.2 g of $Na_2HPO_4$ and 0.73 g of $NaH_2PO_4 \cdot 2H_2O$ were added. After 3 cycles of deoxygenation with nitrogen, the mixture solution was cooled to 0° C., and 16 g of 2,3,3,3-tetrafluoropropene monomer were added to the reactor. After the resulting mixture had been stirred at 200 rpm for 5 minutes, 20 g of ethylene monomer were injected into the reactor over a time of 10 minutes, by using an injection pump. The reactor temperature was then maintained at 65° C. and the reactor contents were stirred at 400 rpm. After 48 hours, the polymerization was stopped and excessive gas was released from the autoclave. The polymerization latex was coagulated in 25% HCl and the polymerization product was washed with distilled water and dried at 50° C. overnight. Finally, 18 g of white elastomer were obtained with a product yield of 50%. The product, composed of 18.9 mole percent of 1234yf and 81.1 mole percent of ethylene, was an amorphous fluoroelastomer having a glass transition temperature of −33° C., as determined by differential scanning calorimetry. The fluorine content of the elastomer was 32.48%.

Example 7

Synthesis of Fluoroelastomer

To a 1000 mL high pressure reactor, 300 mL of deionized water, 6 g of ammonium perfluorooctonoate, 0.82 g of ammonium persulfate, 2.4 g of $Na_2HPO_4$ and 1.46 g of $NaH_2PO_4 \cdot 2H_2O$ were added. After 3 cycles of deoxygenation with nitrogen, the mixture solution was cooled to 0° C., and 66 g of 2,3,3,3-tetrafluoropropene monomer and 0.55 g of octafluoro-1,4-Diiodobutane were added to the reactor. After the resulting mixture had been stirred at 200 rpm for 5 minutes, 65 g of ethylene monomer were injected into the reactor over a time of 10 minutes, by using an injection pump. The reactor temperature was then maintained at 65° C. and the reactor contents were stirred at 400 rpm. After 48 hours, the polymerization was stopped and excessive gas was released from the autoclave. The polymerization latex was coagulated in 25% HCl and the polymerization product was washed with distilled water and dried at 50° C. overnight. Finally, 112 g of white elastomer were obtained with a product yield of 85%. The product, composed of 22.7 mole percent 1234yf and 77.3 mole percent of ethylene, was an amorphous fluoroelastomer having a glass transition temperature of −17° C., as determined by differential scanning calorimetry. The fluorine content of the elastomer was 36.56%.

Example 8

Glass Transition Temperature and Solvent Resistance of Fluoroelastomers

As shown below in Table 1 below, in case the mole ratio of fluoroolefin monomers, such as 2,3,3,3-tetrafluoropropene, to ethylenically unsaturated co-monomers, such as ethylene monomers, is from about 1:0.8 to 1:4.3, the glass transition temperature Tg (° C.) of the resulting fluoroelastomer (e.g., 1234yf-co-ethylen) is low, i.e., from about −3 to about −33° C.

TABLE 1

Mole ratio and Tg of 1234yf-co-ethylene

| Mole ratio (1234yf:ethylene) | Tg/° C. (1234yf-co-ethylene) |
|---|---|
| 1:0 | 53 |
| 1:0.8 | −3 |
| 1:1.4 | −5 |
| 1:1.6 | −8 |
| 1:2.9 | −15 |
| 1:3.4 | −17 |
| 1:4.3 | −33 |
| 1:7 | −2.7 |

Table 2 below shows that the fluoroelastomers (e.g., 1234yf-co-ethylene) of the present invention also exhibited good resistance to a variety of solvents, such as alcohols, glycols, ethers and esters.

TABLE 2

1234yf-co-ethylene elastomer solubility test results

| Solvent | Solubility |
|---|---|
| Methanol | Insoluble |
| Ethanol | Insoluble |
| Ethlene glycol | Insoluble |
| Propylene glycol | Insoluble |
| Propanol | Insoluble |
| Butanol | Insoluble |
| Petroleum ether | Insoluble |
| Ethyl acetate | Insoluble |
| Acetone | Soluble |
| Tetrahydrofuran | Soluble |

What is claimed is:

1. A fluoroelastomer comprising a copolymer consisting essentially of:
   (a) one or more fluoroolefin monomers selected from the group consisting of 2,3,3,3-tetrafluoropropene, 1,3,3,3-tetrafluoropropene, 1-chloro-3,3,3-trifluoropropene, and mixtures thereof, and
   (b) one or more ethylenically unsaturated co-monomers;
   wherein the ethylenically unsaturated co-monomer is selected from the group consisting of ethylene, propene, cyclopentene, cycloheptene, cyclooctene, and mixtures thereof;
   wherein all the ethylenically unsaturated co-monomers together are present in the copolymer in an amount of from about 30 to about 95 mole percent of all the monomers of the copolymer;
   and
   wherein the fluoroelastomer has a glass transition temperature (Tg) of less than 0° C.

2. The fluoroelastomer of claim 1, wherein the fluoroelastomer has a glass transition temperature (Tg) as low as about −60° C.

3. The fluoroelastomer of claim 1, wherein the fluoroelastomer has a glass transition temperature (Tg) of from about −2.7° C. to about −33° C.

4. The fluoroelastomer of claim 1, wherein the copolymer further includes curing site monomers.

5. The fluoroelastomer of claim 4, wherein the curing site monomers are selected from the group consisting of iodo-containing compounds, bromo-containing compounds, iodobromo-containing compounds, and mixtures thereof.

6. The fluoroelastomer of claim 5, wherein all the curing site monomers together are present in an amount of from about 0.02 to about 2 mole percent of all the monomers of the copolymer.

7. The fluoroelastomer of claim 5, wherein the iodo-containing compounds are selected from the group consisting of octafluoro-1,4-diiodobutane, diiodomethane, 1,2-diiodoethane, 1,3-diiodo-n-propane, 1,3-diiodoperfluoropropane, 1,3-diiodo-2-chloroperfluopropane, 1,4-diiodoperfluobutane, 1,6-diiodoperfluorohexane, 1,8-diiodoperfluorooctane, 1,12-diiodoperfluorododecane, 1,16-diiodoperfluorohexadecane, and mixtures thereof.

8. The fluoroelastomer of claim 5, wherein the bromo-containing compounds are selected from the group consisting of $CF_2Br_2$, $BrCF_2CF_2Br$, $CF_3CFBrCF_2Br$, $BrCF_2CF_2CF_2Br$, and mixtures thereof.

9. The fluoroelastomer of claim 5, wherein the iodobromo-containing compounds are selected from the group consisting of 2-bromo-4-odoperfluorobutene-1,3-bromo-4-iodoperfluorobutene-1,1-bromo-2-iodoperfluoroethane, 1-bromo-3-iodoperfluoropropane, 1-bromo-4-iodoperfluorobutane, 2-bromo-3-iodoperfluoro-butane, 3,4-dibromo-l-iodo-1,1,2,2,4,4-hexafluorobutane, 3-bromo-4-iodoperfluorobutene-1,2-bromo-4-iodoperfluorobutene-1, and mixtures thereof.

10. The fluoroelastomer of claim 1, wherein the fluoroolefin monomer is 2,3,3,3-tetrafluoropropene present in the fluoroelasotomer in an amount of about 54.5 mole percent and the ethylenically unsaturated co-monomer is ethylene present in the fluoroelastomer in an amount of about 45.5 mole percent, and wherein the fluoroelastomer has a glass transition temperature (Tg) of about −3° C.

11. The fluoroelastomer of claim 1, wherein the fluoroolefin monomer is 2,3,3,3-tetrafluoropropene present in the fluoroelasotomer in an amount of about 38.5 mole percent and the ethylenically unsaturated co-monomer is ethylene present in the fluoroelastomer in an amount of about 61.5 mole percent and wherein the fluoroelastomer has a glass transition temperature (Tg) of about −5° C.

12. The fluoroelastomer of claim 1, wherein the fluoroolefin monomer is 2,3,3,3-tetrafluoropropene present in the fluoroelasotomer in an amount of about 31.3 mole percent and the ethylenically unsaturated co-monomer is ethylene present in the fluoroelastomer in an amount of about 68.7 mole percent and wherein the fluoroelastomer has a glass transition temperature (Tg) of about −8° C.

13. The fluoroelastomer of claim 1, wherein the fluoroolefin monomer is 2,3,3,3-tetrafluoropropene present in the fluoroelasotomer in an amount of about 25.6 mole percent and the ethylenically unsaturated co-monomer is ethylene present in the fluoroelastomer in an amount of about 74.4 mole percent and wherein the fluoroelastomer has a glass transition temperature (Tg) of about −15° C.

14. The fluoroelastomer of claim 1, wherein the fluoroolefin monomer is 2,3,3,3-tetrafluoropropene present in the fluoroelasotomer in an amount of about 18.9 mole percent and the ethylenically unsaturated co-monomer is ethylene present in the fluoroelastomer in an amount of about 81.1 mole percent and wherein the fluoroelastomer has a glass transition temperature (Tg) of about −33° C.

15. The fluoroelastomer of claim 1, wherein the fluoroolefin monomer is 2,3,3,3-tetrafluoropropene present in the fluoroelasotomer in an amount of about 22.7 mole percent and the ethylenically unsaturated co-monomer is ethylene present in the fluoroelastomer in an amount of about 77.3 mole percent and wherein the fluoroelastomer has a glass transition temperature (Tg) of about −17° C.

* * * * *